United States Patent [19]

Staude et al.

[11] Patent Number: 4,636,061
[45] Date of Patent: Jan. 13, 1987

[54] APPARATUS FOR THE AUTOMATIC MICROFILMING OF DOCUMENTS

[75] Inventors: Eckhard Staude; Juergen Kaus, both of Woelfersheim, Fed. Rep. of Germany

[73] Assignee: Firma Eva Staude, Woelfersheim, Fed. Rep. of Germany

[21] Appl. No.: 703,652

[22] Filed: Feb. 21, 1985

[30] Foreign Application Priority Data

Mar. 13, 1984 [EP] European Pat. Off. ........ 84102710.5

[51] Int. Cl.⁴ .............................................. G03B 27/52
[52] U.S. Cl. ........................................ 355/24; 355/27; 355/54; 355/65
[58] Field of Search ........................ 355/27, 54, 28, 64, 355/65, 14 SH, 3 SH, 24, 39, 77

[56] References Cited

U.S. PATENT DOCUMENTS

| | | | |
|---|---|---|---|
| 2,552,266 | 5/1951 | Egan et al. | 355/24 |
| 3,342,100 | 9/1967 | Maloney et al. | 355/65 |
| 3,746,444 | 7/1973 | Kahle et al. | 355/28 |
| 3,853,399 | 12/1974 | Walsh | 355/64 |
| 3,885,871 | 5/1975 | Galatha et al. | 355/24 X |
| 4,035,074 | 7/1977 | Flor | 355/27 |
| 4,076,412 | 2/1978 | Igarashi et al. | 355/28 |
| 4,174,174 | 11/1979 | Hunter, Jr. et al. | 355/54 X |
| 4,190,353 | 2/1980 | LaRue, Jr. | 355/24 |
| 4,192,594 | 3/1980 | Oidaira et al. | 355/28 X |
| 4,324,474 | 4/1982 | Kraemer et al. | 355/65 |
| 4,408,876 | 10/1983 | Steidle | 355/54 |

Primary Examiner—L. T. Hix
Assistant Examiner—D. Rutledge
Attorney, Agent, or Firm—Robert J. Koch

[57] ABSTRACT

An apparatus for the automatic microfilming of documents of different formats and the development of exposed microfilms in a continuous process. The apparatus includes a computer controlled combination of (a) an installation for the automatic insertion of documents and their transport through an exposure device from a stack of documents of a certain format, with means to adjust to a given format; (b) an interchangeable lens camera with an illumination and mirror system for the simultaneous imaging of the front and reverse side of the document and with an automatic film transport device; (c) a camera with an exposure system for the filming of titles and continuous identifications; (d) an automatic film development installation; and (e) a central guide and control system with an input keyboard, a monitor and a processor.

16 Claims, 6 Drawing Figures

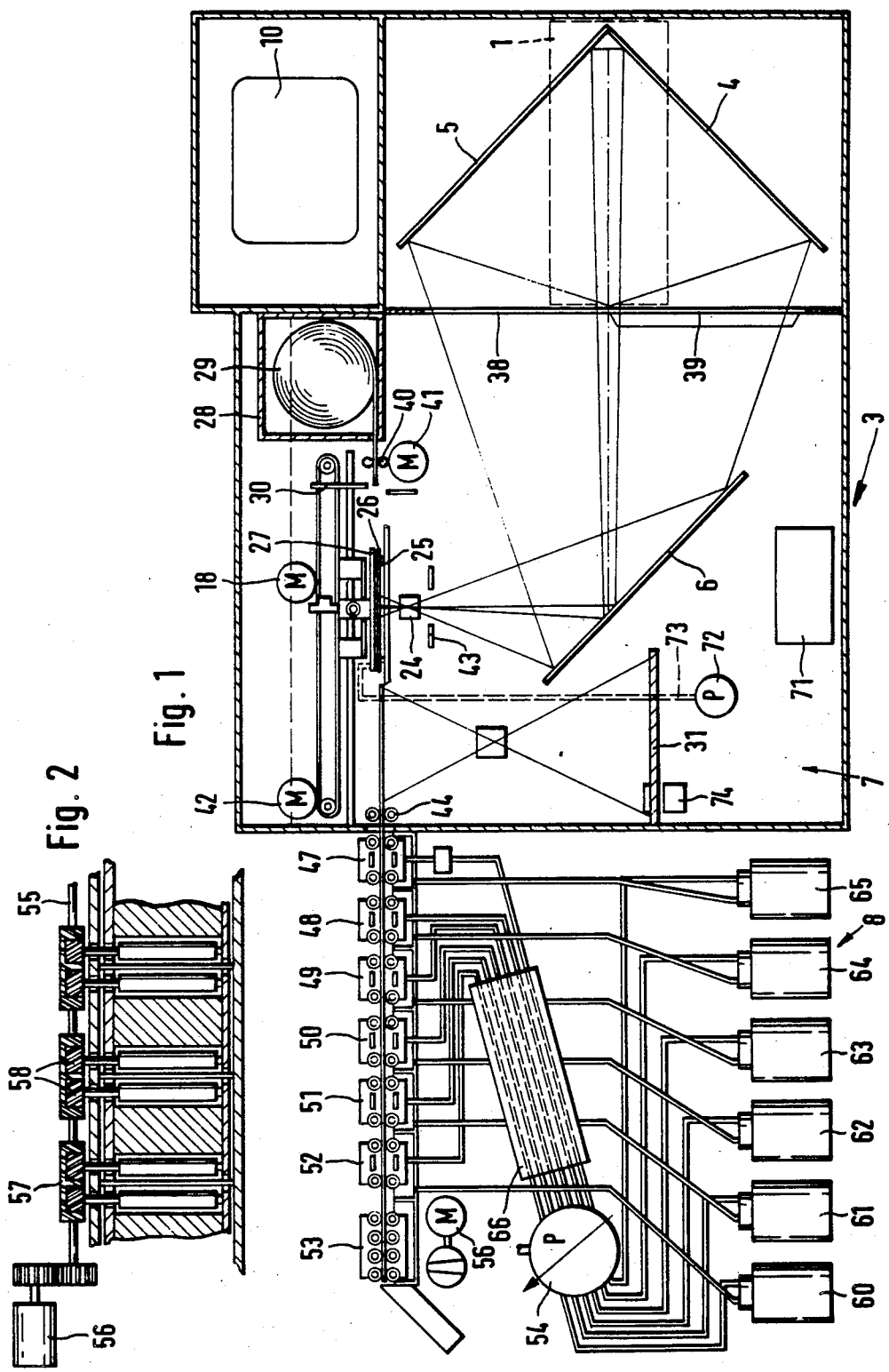

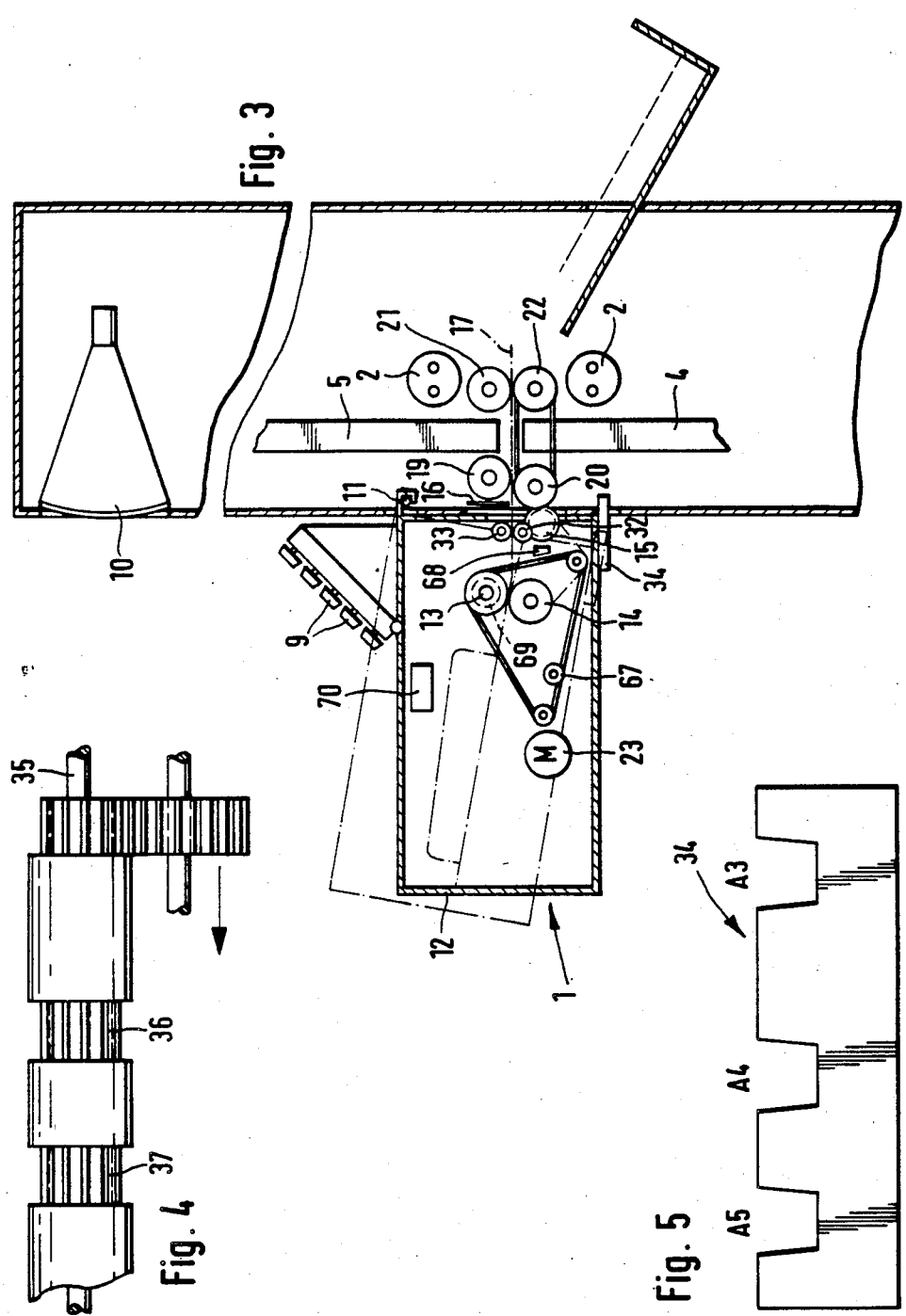

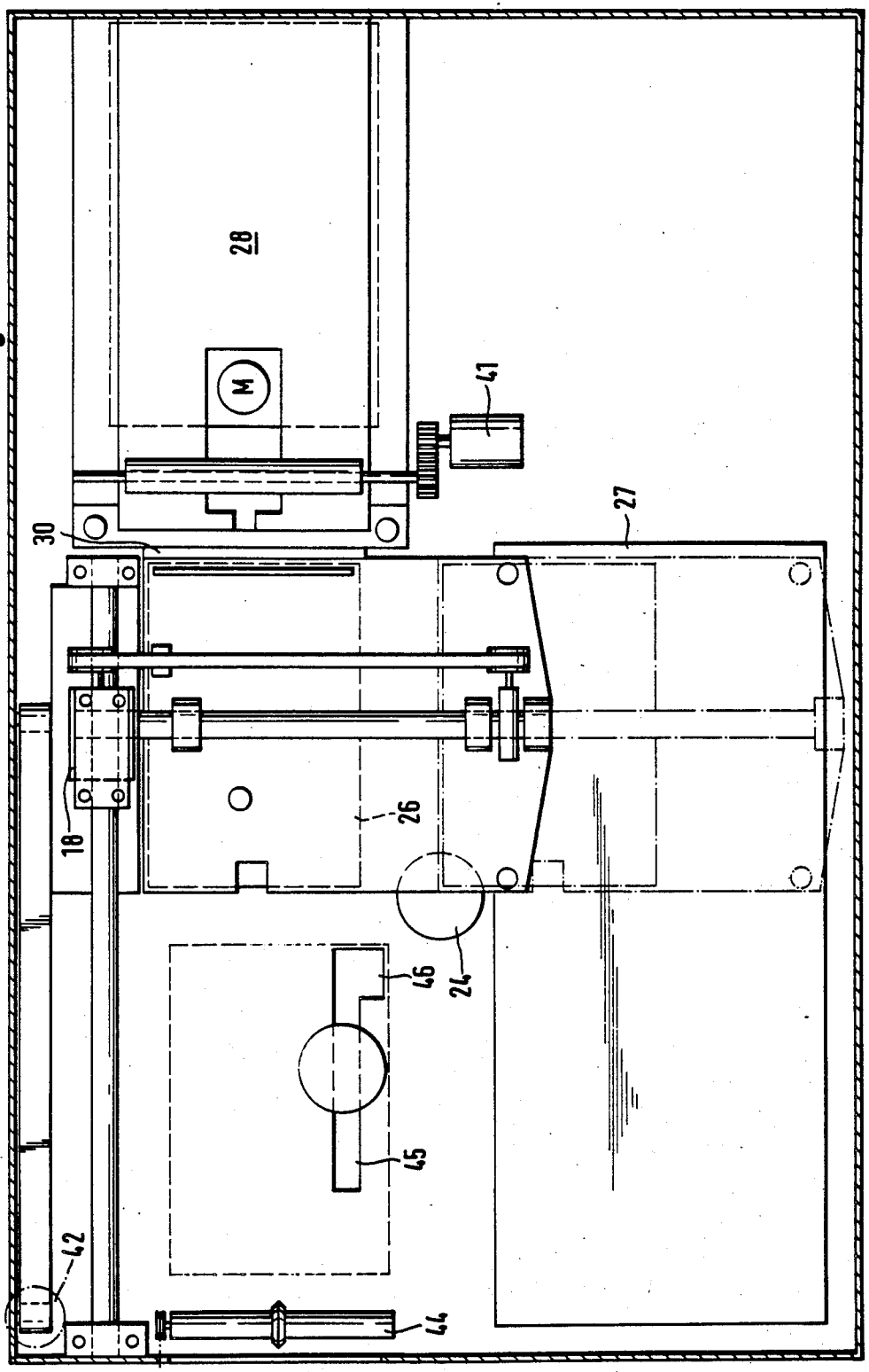

APPARATUS FOR THE AUTOMATIC MICROFILMING OF DOCUMENTS

BACKGROUND OF THE INVENTION

1. Field of the Invention

The invention relates generally to the art of document microfilming and, more particularly, to the automatic microfilming of documents havng various formats. The invention also provides for the development of exposed sheets of microfilm in a continuous process.

2. Description of the Prior Art

Microfilming is eminently suitable for the safeguarding of documents of any kind and/or the space saving acquisition and reproduction of literature references. It is therefore used intensively in a great variety of applications, such as for example in banks, libraries, industrial enterprises, institutes and patent offices, both in this country and abroad.

Cameras are known for microfilming whereby the documents to be filmed are taken up manually and individually. The exposure of a sheet film or fiche is followed separately and by means of a special camera or specific auxiliary devices by the filming of the title and the identification. The counting of the individual film sheets of a series is effected by the operator, who must prepare and film a corresponding image in order to apply the serial number and/or the date of the film to the sheet film. Following the completion of this work the sheet film is conveyed to a known, automatic developing apparatus, which develops the exposed film and discharges it in the dry state.

Numerous users of the microfilm technique must record large volumes of documents, often with different formats, in the shortest time possible, both with their front and reverse sides. Often, too, certain identifying notations which are not present on the documents themselves, such as for example registration numbers, company identification and the like must be recorded simultaneously. Operations of this type performed with the means known at this time are highly labor-intensive and time consuming. Furthermore, identification errors are easily possible so that the entire filming of large numbers of documents must be repeated.

SUMMARY OF THE INVENTION

It is an object of the invention to provide an apparatus for microfilming and film development, whereby the automatic filming of a large number of documents is possible and, optionally, the front and reverse side of a document may be exposed simultaneously.

Another object is to provide such an apparatus in which counting is automatic and, in the same camera, both the filming of a title, a company mark and a running and thus varied identification, such as for example the date, takes place in the same working step as the filming of the documents. Thus, filming takes place in a continuous process while, however, the title itself is photographed in the form of a still image.

It is a further object of the invention to design an apparatus for the microfilming of documents so that filming in a continuous or flow-through process, and also in a still image process by the switching or replacement of a few structural elements, becomes possible via simple means.

These objects are attained, according to the invention, by a computer controlled combination of the following systems:

(a) an installation for the automatic insertion and conveyance of documents through an exposure device from a stack of documents of a certain format fed into the apparatus, with format adjusting means;

(b) an interchangeable lens camera with an exposure and mirror system for the simultaneous exposure of the front and reverse sides of documents, and with an automatic film transport;

(c) a camera with an exposure system for the filming of titles and running identifications;

(d) an automatic film developing apparatus; and (e) a central guide and control system with an input keyboard, a monitor and a processor device.

The installation for the automatic insertion of documents according to the invention comprises a document receiving chute adjustable around an axle and equipped with a contrarotating roll system. The roll system has an adjustable roll gap and different friction coefficients for the rolls. The rolls are followed by a double sheet interlock with a pulse generator in the form of a light barrier or a microswitch which, upon the arrival of a document in the exposure plane subsequent to the document input device, produces a pulse to actuate the motor of the film transport device present in the camera.

The automatic document input device thus inserts every document from a stack of documents into the exposure plane from above, and prevents the input of more than one sheet into the exposure plane. For this purpose, the opposing rolls are provided with a precision drive adjustable to the thickness of the document to form a double sheet interlock, with a ball bearing of a roll being capable of acting on a microswitch, the microswitch in turn actuating a magnetic clutch of the upper roll. Consequently, if two documents are pressured through the defined narrow gap of the rolls, one of the adjustable ball bearings yields and thereby actuates the microswitch, which in turn immobilizes the upper roll by means of the magnetic clutch, so that the forbidden simultaneous transport of two documents is prevented.

In a further development, a transport roll system follows the rolls of the document input installation, the rolls thereof being arranged in pairs in front of and after the two-sided exposure plane, with the drive of the rolls being effected by the motor of the document input installation, and the motor being equipped with an angular momentum or pulse generator 67 and a tachogenerator.

Advantageously, the rpm of the motor of the input installation may be adjusted as a function of the degree of the light reflection of the document, measured and processed immediately prior to the insertion of the document in an integrated manner by means of an electronic element 70.

In a further development of the invention, the exposure plane has a light permeable slit over the maximum processable width of the document and both above and below the plane of exposure mirrors are arranged at an angle of 45°, the reflecting light beams thereof traveling, by means of another mirror, through an interchangeable objective lens to the image plane. The sheet film (fiche) to be exposed is located on a slide displaceable by a motor in a plane parallel to the image plane, in a manner such that both the front and reverse sides of the document may be imaged simultaneously and adjacent to each other.

According to the invention, the interchangeable lens camera comprises a film cassette with a film roll and a subsequent, automatically actuated cutting device, from which the slide receives the sheet film obtained in this manner and transports it to the imaging position. The sheet film then either passes through synchronously with the motion of the document exposed in a continuous exposure process, or remains in the imaging position during the time of exposure in the case of a still process. The slide to hold the sheet film is therefore equipped with a vacuum device.

Motion of the slide to arrange the images on the sheet film is effected, according to a further development of the invention, within a given grid that is adjustable as a function of document size and the degree of reduction, by means of processor controls.

The camera with the interchangeable objective lens is followed directly by the camera with an exposure system for the filming of titles and identifications, and the slide with the exposed sheet film is advantageously designed so that it may be moved automatically into the title and identification imaging position.

The device for filming of the identification further comprises an electronically controlled, luminescent alphanumerical display and a device for the insertion and transillumination of a diapositive in the objective plane of the camera.

The processor controlled display has multiple lines or, in another embodiment of the invention, the motion of the slide is programmed with a line jump for the successive exposure of each line.

The double camera is followed by an automatic developing installation connected with a sheet film transfer device, wherein the exposed sheet film is made to pass successively through different work stations along a horizontally arranged track by means of a motor driven roll system. Each of the work stations is supplied with the proper liquid by a liquid circulation system from a vessel, which is in the form of a transport container having inlet and outlet lines. The developer part of the automatic developing installation is followed by a sheet film drying station which discharges the developed and dried finished film.

Further objects, features and advantages of the present application will become apparent from the detailed description of the preferred embodiments, which follows, when considered together with the attached drawings.

BRIEF DESCRIPTION OF THE DRAWINGS

In the drawings:

FIG. 1 shows a schematic view of the combination apparatus according to the invention in a lateral elevation;

FIG. 2 shows an enlarged view of a section of the transport device in the automatic developer;

FIG. 3 shows a schematic view of the means for the automatic insertion of documents in a lateral elevation;

FIG. 4 shows a transport roll, enlarged and in a sectional view, of the means for the automatic insertion of documents;

FIG. 5 shows a format positioning mounting, enlarged and in a section, of the means for the automatic insertion of documents, FIG. 6 is a top view of the double camera apparatus in a schematic view slightly enlarged with respect to FIG. 1.

DETAILED DESCRIPTION OF THE PREFERRED EMBODIMENTS

As seen in FIG. 1, the apparatus comprises a combination of several devices, monitored and controlled by means of a central guide and control system. For the input of commands and of certain identifications and data, to be described in detail below, an input keyboard 9 and for visual display a monitor 10 and a processor unit, are provided.

The apparatus consists of the following devices, as shown in FIGS. 1 and 3:

a device 1 for the automatic insertion and transport of documents, including an exposure installation 2 and format adjusting device;

an interchangeable lens camera with an exposure and mirror system 4, 5, and 6 for the simultaneous imaging of the front and reverse sides of the document and with automatic film transport means;

a camera 7 with a exposure system for the filming of titles and running identifications; and an automatic film developing installation 8.

The device 1 for the automatic insertion of documents is equipped with document receiving means 12 laterally adjustable around an axle 11 and provided with a contrarotating or counter-driven roll system 13, 14 with an adjustable roll gap and having roll surfaces with different friction coefficients. The roll system 13, 14 (FIG. 3) is followed by a double sheet interlock 15. A pulse generator 16 in the form of a light barrier produces a pulse for the actuation of the motor 18 upon the entry of a document into the exposure plane following the document input 1, the motor 18 being located in the camera of the film transport device.

The opposing rolls 13, 14 are equipped with a precision drive adjustable to the thickness of the document to form a double sheet interlock, wherein a ball bearing acts on a microswitch 68 which in turn actuates, by means of a processor, a magnetic clutch 69 of the upper roll 13.

As seen further in FIG. 3, the rolls 13, 14 of the document insertion device are followed by a transport roll system. The rolls 19, 20, 21, and 22 thereof arranged in pairs before and after the two-sided exposure plane 17. Rolls 19-22 are driven by motor 23 of the document insertion device comprising an angular momentum generator and a tachometer.

The rotating velocity of the motor 23 is controlled as a function of the degree of luminous reflectance of the document. The reflectance is measured and processed in an integrated manner by means of an electronic element immediately prior to the insertion of the document, as explained below.

The installation 1 for the automatic document insertion therefore performs several functions. It insures that only a single document is seized from the stack of documents and thereafter is conveyed into the imaging or exposure plane 17.

For this purpose the rolls 13 and 14 rotate against each other, with roll 13, which draws in the document, achieving a higher frictional effect than the rubber of the lower roll rotating in the opposite direction and retaining the lower documents. If in spite of this, two or more sheets are transported simultaneously through rolls 13 and 14, the subsequent double sheet interlock always prevents travel of the documents into the exposure plane 17. By means of the precision drive of the double sheet interlock, comprising, inter alia, rolls 32 and 33, the ball bearings are adjusted narrowly so that only one document can pass. If in contrast, two or more documents are pressured through the narrow gap of the rolls, the ball bearings yield by at least the thickness of one document and actuate a microswitch, which in turn acts, by means of a processor, on a magnetic clutch 69 affecting the roll 13, so that the input of documents is discontinued.

In this special case, which in practice can occur by the action of special effects only, such as for example the unintentional mutual adherence of two documents, it is necessary for the operator to insert the documents individually by hand. In any case, the erroneous exposure of the sheet film is prevented and excluded.

When a document arrives in the exposure plane 17, the pulse generator 16 of the document inserting device produces a pulse acting on the motor 18 of the interchangeable lens camera 3, whereby the XY slide 27 is moved synchronously with the document transport in the Y direction. The pulse generator consists of a light barrier.

If the light barrier, i.e., the pulse generator 16, is actuated by the passage of a document and the document is seized by transport rolls 19 and 20, the latter effects its further transportation, and simultaneously deactivates the magnetic clutch of the rolls 13 and 14, until the document has left the exposure plane 17.

The motor 23 of the installation 1 for the insertion of the documents, comprising an angular momentum generator and a tachogenerator, simultaneously drives the transport rolls 19 and 20 which are immobilized during the process of inserting the documents by the deactivation of the magnetic clutch.

The document insertion installation 1 may be used for documents of different sizes, for example for the DIN (German Industrial Standard) A3 to DIN A5 formats. In order to maintain the grid alignment of the sheet film, it is necessary to provide suitable stops, so that the documents always travel into the exposure plane in a straight line. Consequently, the document insertion device 12 is adjustable laterally with respect to the exposure plane 17 and the direction of document insertion, as seen in FIG. 3. In order to effect the adjustment of the document insertion device 12, the latter must be pivoted upwards and displaced laterally, i.e., out of the plane of the drawing.

A format positioning mounting 34, shown in FIG. 5, has recessess corresponding to the format. The transport axle 35, shown in FIG. 4, insures, by the toothed wheels 36 and 37 located on an axle, that the insertion of the documents and thus the drive of the rolls 13 and 14 is uniform in any format position.

Prior to the arrival of the document in the exposure plane 17, its luminous reflectance is measured integrally, over the surface of the document, to control the velocity of the motor 23. The reflectance values measured are processed in the processor 71 or computer, and the motor velocity is regulated so that darker documents are moved more slowly, and brighter documents more rapidly, through the exposure plane 17. In this manner, the standard density required by the DIN for microfilms is obtained.

The exposure plane 17 has a light permeable slit over the maximum width that may be processed. Both above and under the exposure plane 17, mirrors 4 and 5, respectively, are arranged at angles of 45°, the reflected beams thereof traveling by means of another mirror 6, through an interchangeable objective lens 24, and thence to an image plane 25. The sheet film 26 to be exposed is located in a slide 27 displaceable by a motor in a plane parallel to image plane 25. Both the front and the reverse side of the document may be imaged simultaneously in the image plane.

The interchangeable lens camera 3 comprises a film cassette 28 with a roll of film 29 and a subsequent, automatically actuated cutting device 30, from which the slide 27 takes the sheet film produced in this manner by means of a suction device. The slide conveys the film to the proper image position, while passing through in a continuous imaging process synchronously with the motion of the exposed document, or in a still image process remaining in the image position involved. To hold the sheet film, the slide 27 is equipped with a vacuum device.

The movements of the slide 27 to coordinate the images on the sheet film is effected within a given grid, adjustable as a function of the document size, by means of the processor controls.

The mirror 5 located above the exposure plane 17 reflects the front side, and the mirror 4 located under the exposure plane 17 reflects the reverse side of the document onto the mirror 6, which is inclined by 135° with respect to the exposure plane 17. Exposure slits 38 and 39 are arranged between mirrors 4, 5 and 6. Slit 39 is closed when the reverse side of a document is not to be reproduced in order to prevent the appearance of stray light.

Fluorescent tubes, a bank of lights or halogen lamps, are used as the sources of light 2 for the exposure plane 17. As the documents and the sheet film travel in the same proportion as the reduction factor over a narrow slit of the exposure plane 17, the two mirrors 4 and 5 are only approximately 20 mm wide. Consequently, the imaging slit between the front and the reverse side of the document is also smaller by the reduction factor. Thus, for example, with a reduction factor of 1:24 and a mirror width of 20 mm, the image on the sheet film or fiche is 0.83 mm.

As the lens 24 is interchangeable, different reduction factors may be used. Each objective lens is equipped with an indexing element so that the computer receives the proper reduction factor without a special input and applies it to its program.

The same optical system may also be used for still exposures. For this purpose, it is merely necessary to enlarge the mirrors so that the entire document is covered simultaneously, as the document and the sheet film must remain immobile at the instant of the exposure.

In the exposure part of the interchangeable lens camera 3, a light-proof film cassette 28 is present. The cassette contains a 105 mm wide by 30.5 m long panchromatic, high resolution microfilm. The unexposed film is drawn by the transport rolls 40 driven by a motor 41 into the film cassette, until a distance of 148 mm is obtained between a light barrier and the cutting device 30. The film is then cut to this specified length. The cutting device is in the form of a drop blade inclined with respect to the cutting plane.

The XY slide 27, driven by the motor 18 in the Y direction and by the motor 42 in the X direction, travels over the cut DIN A6 fiche or sheet film and grips it by means of a vacuum produced by a vacuum pump 72 through line 73. The film then lies absolutely flat under the slide 27. All of the functions of the exposure part and the moving steps to be effected by the XY slide in order to make possible the exposures at the designated locations of the sheet film, are controlled by the computer in keeping with the optics and the formats used within the given grid. The DIN A6 film may thus be exposed with different grids, as a function of the reduction factor and the size of the document. The grid also determines the number of exposures per sheet film.

The position of each individual image is determined alphanumerically and recorded by the computer. The present camera is laid out with respect to its programming so that documents are exposed in the grid specified by the DIN. The positioning of the individual documents may be recorded in the form of codes on the sheet film and/or on special data carriers so that these values may be used in subsequent reader instruments to locate specific documents. In principle, any imaginable grid may be used, as this is merely a question of programming.

In contrast to a known stepping camera, the XY slide runs with the film as soon as the document enters the imaging and exposure plane, synchronously and in continuous, counterflow fashion, in a proportion determined by the reduction factor, until the image strip determined by the grid is attained. The counter flow motion is obtained by the image reversing effect of the optical elements.

As soon as all of the images are exposed on the Y axis of the sheet film, the slide moves on the X axis in the simplex process, i.e., when only one side of the document is exposed, into the next column, or in the duplex process, i.e., when both the front and reverse side of the document are exposed, into the next but one column. Simultaneously, the Y motor returns the XY slide into the initial position of the exposure column of the sheet film.

When the entire sheet film is exposed, or the document charge intended for this sheet film is completed, the XY slide moves into the camera 7 which immediately follows the interchangeable lens camera with its own exposure system for the filming of titles and identifications. This movement of the XY slide with the exposed sheet film is again effected in a fully automatic manner under the control of the computer. Under the optical assembly, i.e., in its beam inlet, an auxiliary shutter 43 is located (FIG. 1) to protect the film from stray light during the stop at the frame line, during the return, i.e., the so-called column jump and while the camera is inactivated.

The camera 7 for the identification filming comprises an electronically controlled, luminescent alphanumeric display 31 in the object plane of the camera 7. The camera 7 is further equipped with an electronically controlled diapositive insertion and illumination device 74 (FIGS. 1 and 6) for the identification filming. The display 31 may be multiline or the movement of the XY slide 27 may be programmed, in the case of a single line display, with a line jump for the successive exposure of the line. The display 31 is lettered by means of a keyboard 9 or automatically, for example in the case of continuous counting or the recording of the date, if desired. For the insertion of a title, a definite field is provided on the sheet film so that in case of the usual standards a corresponding title slit 45 is established.

While the electronic display 7 is luminescent, it is necessary to provide projection illumination for the filming of a diapositive slide. A special diapositive slit 46 is present to insure correct field coordination on the sheet film.

The title exposure device integrated with the principal camera makes it possible for the user to apply, in a few seconds, different identifications over sheet film immediately after the film has been exposed. The identification, such as, for example, company identifications, are applied in columns successively over the exposed images and can be of a size readable without auxiliary means. The identifications can be applied over a sheet film length of 148 mm and, by means of an inserted diapositive, a single or multiple line title can be applied with, for example 40 characters, and/or a date, continuous recording number or code can be inserted. A text fed into the input or keyboard 9 of the computer for display obviously may be used or altered as often as necessary. Exposure times are automatically determined by the computer, which process and evaluates the measured luminescence data.

The camera 7 is followed immediately by a sheet film transfer device 44, which takes the exposed sheet film from the XY slide and conveys it to the developing station 8. In the automatic developing station 8 the exposed sheet film passes successively through the different work stations 47 to 53 along a horizontal track with the aid of a motor driven roll system 54. Reference is made here to FIGS. 1 and 2. Each of the working stations 47 to 52 is supplied with the necessary liquids by a liquid circulation system 54 from a vessel in the form of a transport container by means of inlet and outlet lines. The developer part of the automatic development station is followed by a sheet film dryer station 53, which discharges the exposed and finished dried film.

In the automatic developing installation the film is transported by means of a transport roll system, shown enlarged in FIG. 2. A continuous king journal 55 driven by the motor 56, is equipped with spindles 57 engaged by the toothed wheels 58, which in turn are connected with the transport rolls.

The automatic developing installations is capable of performing both a negative and a positive or fully reversed process, for which it is merely necessary to interchange the liquid vessels. The negative process requires a developer, a stop bath, a fixer and 3 rinsing baths, while the fully reversed process requires a first developer, a first rinse, a bleaching bath, a clearing bath, a second developer and a second rinse. In the process, the film passes horizontally through the automatic installation and the chemicals are applied to the film from their packaging bottles 60 to 65 in a recycling process through the pump 54 and the heat exchanger 66. The baths are maintained at the operating temperature required by means of an electronic device, which releases the developer installation only after the necessary operating temperatures are attained.

The computer includes the keyboard 9 and the monitor 10. The computer performs all of the control and regulating functions and their surveillance, while displaying the most important ones, depending on programming, on the monitor.

Particularly important is the display of the grid in the form of a template, wherein each exposed image is shown in its corresponding field. The operator is thus able to determine at any given time which of the fields of the grid has just been exposed and which of the fields are still free.

In the course of filming, every document may be provided, by means of the keyboard 9, with a search concept that may be passed to a memory through the computer.

The memory may consist of the sheet film itself, which may be equipped for example with an optically or magnetically readable bar code, or of a diskette or a magnetic tape correlated with the series of sheet film.

If this storage medium is connected with a suitable reader or an enlarging apparatus, the great advantage is obtained that, by means of the search concept, each individual image can appear on the screen of the reader within a very short period of time, so that it may be read or an enlarged copy may be prepared. All drives and motors A8, 23, and 42 can be DC-motors or step-motors.

What is claimed is:

1. An apparatus for the automatic microfilming of documents of different formats and the development of exposed microfilm sheets in a continuous process, the apparatus including a computer controlled combination of systems, comprising:
   (a) means for the automatic insertion and transport of documents through an exposing device from an input of stacked documents of a certain format with a format adjusting device;
   (b) an interchangeable lens camera with an exposure and mirror system for the simultaneous imaging of the front and reverse sides of the document and with automatic film transport means;
   (c) a second camera having an exposure system for the filming of titles and running identifications;
   (d) means for the development of film; and
   (e) a central guide and control system with an input keyboard, a monitor and a processor device.

2. An apparatus according to claim 1, wherein the apparatus further includes a first pulse generator which produces a pulse upon the arrival of the document in an exposure plane of the exposing device, said pulse controlling a motor in the film transport means of the camera; and
   wherein said means for automatic insertion and transport of documents includes a document insertion device adjustable laterally around an axis and equipped with a counter driven roll system with an adjustable roll gap and having roll surfaces with different friction coefficients, followed by a double sheet interlock.

3. An apparatus according to claim 2, wherein said means for the automatic insertion and transport of documents further includes a pulse generator, driven by a motor, said generator thereby driven synchronously with the counter driven roll system of the document insertion device.

4. An apparatus according to claim 2, wherein the counter driven roll system of the document insertion device includes opposing rolls provided with a precision drive adjustable to the thickness of the document to form the double sheet interlock, said drive including a ball bearing capable of acting on a microswitch, the microswitch in turn actuating a magnetic clutch of the upper roll.

5. An apparatus according to claim 2, wherein the opposing rolls of the document insertion device are followed by a transport roll system having rolls arranged in pairs in front and behind a two-sided exposure plane, wherein the transport rolls are driven by a motor, said motor including a second pulse generator and a tachogenerator.

6. An apparatus according to claim 5, wherein the rotational velocity of the motor of the document insertion device is controlled as a function of the light reflectance measured and processed immediately prior to the input of the document, by means of an electronic element and in an integrated manner.

7. Apparatus according to claim 2 wherein the exposure plane has a light permeable slit over the maximum processable width and wherein the mirror system includes mirrors arranged both above and below the exposure plane at an angle of 45° to thereby reflect beams of light through another mirror and thereafter, through an interchangeable objective lens to an image plane, wherein sheet film is located on a slide displaced by a motor in a plane parallel to the image plane, in a manner such that both the front and the reverse side of the document may be imaged simultaneously, adjacent to each other in the plane of the sheet film.

8. An apparatus according to claim 1, wherein the interchangeable lens camera comprises a film cassette with a film roll and a subsequent, automatically actuable cutting device, from which the slide takes the sheet film produced in this manner by means of a suction device, and conveys it to the imaging position and passes it through continuously in a continuous imaging process synchronously with the motion of the exposed document, or maintains it in the imaging position during the exposure period in a still imaging process.

9. An apparatus according to claim 8, wherein a slide is provided with a vacuum device to hold the sheet film.

10. An apparatus according to claim 9, wherein the movement of the slide for the coordination of the images on the sheet film in a given grid is adjustable, as a function of the size of the document, by means of processor control.

11. An apparatus according to claim 10, wherein the interchangeable lens camera is followed directly by the second camera having an exposure system for the filming of titles and identification, and wherein a slide with the exposed sheet film is moved automatically into the titling and identification position.

12. An apparatus according to claim 11, wherein the exposure system of the second camera includes an electronically controlled and luminescent alphanumeric display in the object plane of the second camera.

13. An apparatus according to claim 11 wherein the exposure system of the second camera includes an electronically controlled diapositive insertion and illumination device.

14. An apparatus according to claim 12, wherein the display is selected from a multiline form and a form wherein the motion of a slide is programmed with a line jump for a successive exposure of the line.

15. An apparatus according to claim 1 wherein the camera is followed by a means for automatic developing of film combined with a sheet film transfer device, the exposed sheet film passing successively through different work stations along a horizontally arranged track by means of a motor driven roll system, each of said work stations being supplied with the necessary liquid from a vessel in the form of a transport container having inlet and outlet lines, the developer part of the automatic developing means being followed by a sheet film drying station.

16. An apparatus according to claim 15, wherein said sheet film exhibits an optically or magnetically readable memory medium for the storage of a search or identification symbol.

* * * * *